US009012061B2

(12) United States Patent
Yashiki et al.

(10) Patent No.: US 9,012,061 B2
(45) Date of Patent: Apr. 21, 2015

(54) METHOD FOR PRODUCING POLYOLEFIN POROUS FILM, AND LAMINATED POROUS FILM

(71) Applicant: Sumitomo Chemical Company, Limited, Chuo-ku, Tokyo (JP)

(72) Inventors: Daizaburo Yashiki, Niihama (JP); Toshiki Innami, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/377,076

(22) PCT Filed: Jan. 31, 2013

(86) PCT No.: PCT/JP2013/052228
§ 371 (c)(1),
(2) Date: Aug. 6, 2014

(87) PCT Pub. No.: WO2013/118638
PCT Pub. Date: Aug. 15, 2013

(65) Prior Publication Data
US 2015/0004466 A1    Jan. 1, 2015

(30) Foreign Application Priority Data
Feb. 8, 2012 (JP) ................................. 2012-024791

(51) Int. Cl.
*B29C 55/06* (2006.01)
*B29C 55/08* (2006.01)
(Continued)

(52) U.S. Cl.
CPC ............ *B29C 55/06* (2013.01); *Y10T 156/101* (2013.01); *B29K 2023/00* (2013.01);
(Continued)

(58) Field of Classification Search
CPC .... H01M 2/145; H01M 2/1686; B29C 55/06; B29C 55/085; B29K 2023/00; B29K 2023/0683; B29K 2105/04; B29K 2995/0016
See application file for complete search history.

(56) References Cited

U.S. PATENT DOCUMENTS 4,104,769 A * 8/1978 Levy et al. .................... 26/92
4,620,956 A   11/1986 Hamer
(Continued)

FOREIGN PATENT DOCUMENTS

JP  62-121737 A  6/1987
JP  04-176328 A  6/1992
(Continued)

OTHER PUBLICATIONS

English translation of Notification of Reason(s) for Refusal issued Sep. 30, 2014 in corresponding Japanese Patent Application No. P2012-024791.
(Continued)

*Primary Examiner* — Raymond Alejandro
(74) *Attorney, Agent, or Firm* — Sughrue Mion, PLLC

(57) ABSTRACT

Provided is a method for reproducibly and efficiently producing a polyolefin porous film having a porous structure suitable for a separator for a battery without requiring a special apparatus. The method according to the present invention is a method for producing a polyolefin porous film, the method including conveying a raw material polyolefin sheet having pores into a furnace of a tenter type stretching machine, and tenter-stretching the sheet in a plurality of stretching regions in the furnace to produce a polyolefin porous film, wherein the plurality of stretching regions include at least two stretching regions having different film widening speeds, and the temperature of a stretching region having a high film widening speed is lower than that of a stretching region having a low film widening speed in the at least two stretching regions, and a stretching region having the highest film widening speed is situated in the front stage with respect to a stretching region having the lowest film widening speed.

8 Claims, 5 Drawing Sheets

(51) Int. Cl.
  *C08J 5/18* (2006.01)
  *H01M 2/14* (2006.01)
  *H01M 2/16* (2006.01)
  *B29K 23/00* (2006.01)
  *B29K 105/04* (2006.01)
  *B29K 105/00* (2006.01)
  *B29L 31/34* (2006.01)

(52) U.S. Cl.
  CPC ........ B29C 55/085 (2013.01); *B29K 2105/041* (2013.01); C08J 5/18 (2013.01); *C08J 2323/02* (2013.01); *B29K 2023/0683* (2013.01); *B29K 2105/04* (2013.01); *B29K 2105/256* (2013.01); *B29K 2995/0016* (2013.01); *B29K 2995/0088* (2013.01); *B29L 2031/3468* (2013.01); H01M 2/145 (2013.01); H01M 2/1686 (2013.01)

(56) References Cited

U.S. PATENT DOCUMENTS

| | | | |
|---|---|---|---|
| 6,403,666 B1 * | 6/2002 | Nakayama et al. | 521/142 |
| 2001/0018465 A1 * | 8/2001 | Yano et al. | 521/134 |
| 2005/0012239 A1 * | 1/2005 | Nakashima | 264/216 |
| 2009/0008816 A1 | 1/2009 | Takita et al. | |

FOREIGN PATENT DOCUMENTS

| | | |
|---|---|---|
| JP | 04-181651 A | 6/1992 |
| JP | 2000-102977 A | 4/2000 |
| JP | 2000-248093 A | 9/2000 |
| JP | 2001-162742 A | 6/2001 |
| JP | 2008-214425 A | 9/2008 |
| JP | 2010-59436 A | 3/2010 |
| JP | 2011-515512 A | 5/2011 |
| JP | 2011-246659 A | 12/2011 |
| WO | 2006/104165 A1 | 10/2006 |
| WO | 2009/110396 A1 | 9/2009 |

OTHER PUBLICATIONS

International Search Report for PCT/JP2013/052228, dated Apr. 16, 2013 (PCT ISA 210).

Written Opinion for PCT/JP2013/052228, dated Apr. 16, 2013 (PCT ISA 237).

* cited by examiner

METHOD FOR PRODUCING POLYOLEFIN POROUS FILM, AND LAMINATED POROUS FILM

CROSS REFERENCE TO RELATED APPLICATIONS

This application is a National Stage of International Application No. PCT/JP2013/052228, filed Jan. 31, 2013, claiming priority from Japanese Patent Application No. 2012-024791, filed Feb. 8, 2012, the contents of all of which are incorporated herein by reference in their entirety.

TECHNICAL FIELD

The present invention relates to a method for producing a polyolefin porous film. More particularly, the present invention relates to a method for producing a polyolefin porous film suitable as a constituent member of a non-aqueous electrolyte secondary battery.

BACKGROUND ART

A non-aqueous electrolyte secondary battery, particularly a lithium secondary battery has high energy density, and is therefore widely used as a battery for a personal computer, a mobile phone, a portable information terminal and the like, and recently has been being developed as an on-board battery.

As a separator in a non-aqueous electrolyte secondary battery such as a lithium secondary battery, a porous film having a polyolefin as a principal component, or a laminated porous film obtained by laminating other functional layers with the porous film as a base material is used.

Such a porous film has a structure in which coupled pores are provided in the film, so that a liquid containing ions can permeate from one surface to the other surface through the coupled pores. Therefore, the porous film is suitable as a separator member for a battery in which ions are exchanged between positive and negative electrodes.

Preferably, the porous film has a high porosity from the viewpoint of improvement of the ion permeability. On the other hand, when the pore diameter of pores in the porous film is excessively large, dendrite generated in a negative electrode easily arrives at a positive electrode to cause a short-circuit when the porous film is used as a separator of a battery. Therefore, the pore diameter of the porous film is preferably as small as possible.

Examples of the method for controlling a porous structure of a porous film include a method in which a resin sheet as a raw material is uniaxially or biaxially stretched.

For example, Patent Document 1 discloses a method for producing a porous film in which a porous structure is controlled by stretching a sheet with the strain rate changed in the initial stage to the final stage in stretching while making the stretching temperature constant. Patent Document 2 discloses a method in which the temperature is changed between the upstream stage and the downstream stage in stretching to perform heat-setting. Patent Document 3 discloses a method for producing a thermoplastic resin film in which the temperature in a stretching step is made lower than the temperature in a preheating step in a simultaneous biaxial tenter stretching method.

Usually, however, when a porous film is produced under conditions that increase the porosity, the pore diameter of pores tends to increase, so that it is difficult to balance the porosity and the pore diameter of the film at a practical level.

PRIOR ART DOCUMENTS

Patent Documents

Patent Document 1: Japanese Patent No. 2628788
Patent Document 2: Translation of International Patent Application No. 2011-515512
Patent Document 3: Japanese Patent Application No. 2000-102977

SUMMARY OF THE INVENTION

Problems to be Solved by the Invention

In view of the situations described above, an object of the present invention is to provide a method for reproducibly and efficiently producing a polyolefin porous film having a porosity and a porous diameter that are suitable for a non-aqueous electrolyte secondary battery.

Solutions to the Problems

The present invention provides the following.
<1> A method for producing a polyolefin porous film, the method including a film stretching step of conveying a raw material polyolefin sheet having pores into a furnace of a tenter type stretching machine, and tenter-stretching the sheet in a plurality of stretching regions in the furnace, wherein
    the plurality of stretching regions include at least two stretching regions having different film widening speeds, and the temperature of a stretching region having a high film widening speed is lower than that of a stretching region having a low film widening speed in the at least two stretching regions, and
    a stretching region having the highest film widening speed is situated in the front stage with respect to a stretching region having the lowest film widening speed.
<2> The method for producing a polyolefin porous film according to <1>, wherein the raw material polyolefin sheet is stretched to a thickness of 5% or higher and 40% or lower of the initial value when supplied to the stretching region having the lowest film widening speed.
<3> The method for producing a polyolefin porous film according to <1> or <2>, wherein a difference in temperature between the stretching region having the highest film widening speed and the stretching region having the lowest film widening speed is 10° C. or higher.
<4> The method for producing a polyolefin porous film according to any one of <1> to <3>, wherein
    the film widening speed ($S_A$) in the stretching region having the highest film widening speed is two times or more of the film widening speed ($S_B$) in the stretching region having the lowest film widening speed, where S is defined by the formula (1):

$$\text{film widening speed } S = V \times W/L \tag{1}$$

wherein L represents a distance in a film conveyance direction in each stretching region, W represents a difference between distances between intersections of lines orthogonal to the film conveyance direction and a tenter rail in each stretching region, and V is a speed at which a film passes through each stretching region in a conveyance direction.
<5> The method for producing a polyolefin porous film according to any one of <1> to <4>, wherein the tenter stretching is uniaxial stretching.
<6> The method for producing a polyolefin porous film according to any one of <1> to <5>, wherein the raw material polyolefin sheet includes an ultrahigh molecular weight polyolefin having a weight average molecular weight of 500000 or more and a polyolefin wax having a weight average molecular weight of 2000 or less.

<7> The method for producing a polyolefin porous film according to any one of <1> to <6>, wherein the raw material polyolefin sheet has a porosity of 30 to 50% by volume.

<8> A laminated porous film, wherein a porous layer having fine particles as a principal component and formed by bonding the fine particles by a binder polymer is laminated on the polyolefin porous film obtained by the method for producing a polyolefin porous film according to any one of <1> to <7>.

Effects of the Invention

According to the production method of the present invention, only by using a usual tenter stretching apparatus and appropriately combining a temperature in a stretching step and a film widening speed, a polyolefin film can be stretched without significantly closing pores of the film. Accordingly, a polyolefin porous film suitable for a base porous film as a separator can be produced with high productivity.

DESCRIPTION OF REFERENCE SIGNS

Figure 1:
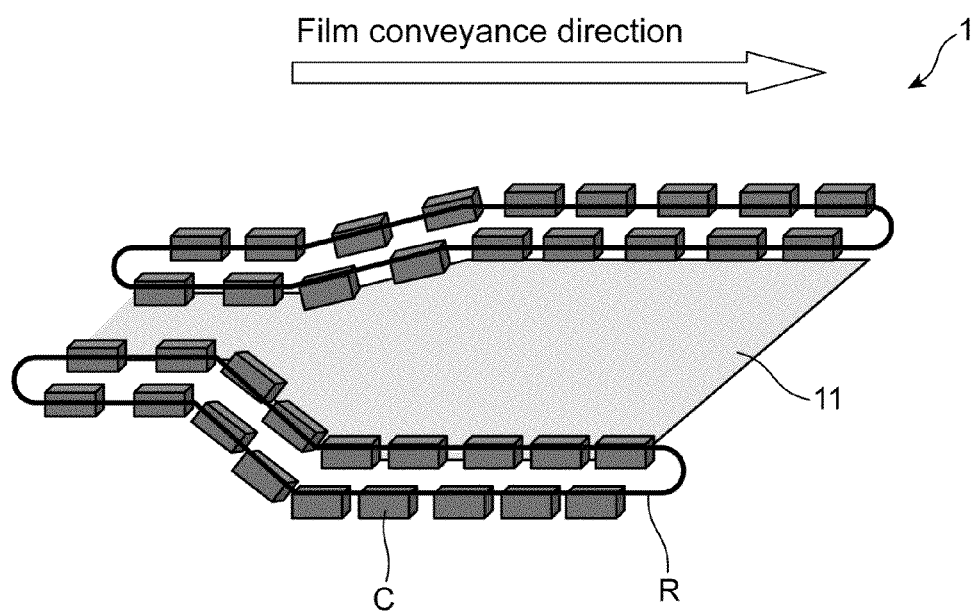
FIG. 1 is a schematic view of a uniaxial tenter type stretching machine.

1: Tenter type stretching machine
10: Raw material polyolefin sheet
11: Polyolefin porous film (stretched film)
20: Heating furnace
21: Preheating region
22: Stretching region (stretching region A)
23: Stretching region (stretching region B)
24: Heat fixing region
C: Chuck
R: Tenter rail
$F_1$: Width of raw material polyolefin sheet
$F_2$: Width of polyolefin porous film (stretched film)
$L_A, L_B, L_C$: Moving distance in a film conveyance direction in each of stretching regions A, B and C (length of each of stretching regions A, B and C)
$W_A, W_B, W_C$: Difference between distances between intersections of lines orthogonal to a film conveyance direction and a tenter rail in each of stretching regions A, B and C
$V_A, V_B, V_C$: Speed at which the film passes in a conveyance direction through each of stretching regions A, B and C
$S_A, S_B, S_C$: Film widening speed in each of stretching regions A, B and C
$T_A, T_B, T_C$: Temperature in each of stretching regions A, B and C Embodiments of the Invention The present invention is a method for producing a polyolefin porous film, the method including a film stretching step of conveying a raw material polyolefin sheet having pores into a furnace of a tenter type stretching machine, and tenter-stretching the sheet in a plurality of stretching regions in the furnace, wherein the plurality of stretching regions include at least two stretching regions having different film widening speeds, and the temperature of a stretching region having a high film widening speed is lower than that of a stretching region having a low film widening speed in the at least two stretching regions, and a stretching region having the highest film widening speed is situated in the front stage with respect to a stretching region having the lowest film widening speed.

In the present invention, the sheet-shaped polyolefin as a raw material is referred to as a "raw material polyolefin sheet", the article obtained by stretching the sheet is referred to as a film, the front stage refers to a front side with respect to the conveyance direction of the raw material polyolefin sheet or the film, and the rear stage refers to the conveyance direction.

The polyolefin porous film (hereinafter, referred to simply as a "porous film" in some cases) can be obtained by so called multi-stage tenter stretching method in which a raw material polyolefin sheet conveyed through the inside of a furnace of a tenter type stretching machine is tenter-stretched in a plurality of stretching regions.

Here, the tenter type stretching machine has a mechanism in which a plurality of portions each called a chuck, which grasp both ends of a film, continuously move on a given tenter rail from the entrance toward the exit of the stretching machine, so that the film is uniaxially or biaxially stretched. Particularly, in the tenter type stretching machine in the present invention, two or more divided stretching regions are provided, the stretching ratio and the film widening speed can be arbitrarily adjusted by adjusting the tenter rail angle for each stretching region, and a temperature can be set for each stretching region.

In the production method of the present invention, the tenter stretching machine may be a uniaxial stretching machine or a biaxial stretching machine, but is preferably a uniaxial machine that has a simple apparatus structure. FIG. 1 shows a schematic view conceptually showing a uniaxial tenter type stretching machine. In FIG. 1, chucks C are tools for grasping a polyolefin porous film 11, and are arranged on a tenter rail R at fixed intervals. The tenter rail R is a portion on which the chuck C moves, and the film 11 can be stretched with the tenter rail R made to have a desired shape.

A film stretching step with a uniaxial tenter type stretching machine 1 will be described below with reference to FIGS. 2 and 3. The film stretching step is a step of stretching a raw material polyolefin sheet 10 in a lateral direction (film width direction) to obtain the polyolefin porous film 11.

In the film stretching step, the raw material polyolefin sheet 10 is laterally stretched by a tenter stretching method. A heating furnace 20 to be used for stretching the film includes a preheating region 21, stretching regions 22 and 23 and a heat fixing region 24.

In each region in the heating furnace 20, the temperature can be independently adjusted, and the temperature can be appropriately set in accordance with a type of raw material polyolefin and film stretching conditions. For example, when the raw material polyolefin sheet 10 is formed of a polyethylene-based resin, the temperature is set within a range of about 80 to 170° C.

First, the raw material polyolefin sheet 10 having a width $F_1$ is fixed by the chuck C in the tenter rail R. Then, the raw material polyolefin sheet 10 is introduced into the preheating region 21 as the chuck C moves on the tenter rail R from the front stage to the rear stage (in the arrow direction). The raw material polyolefin sheet 10 moves with movement of the chuck C while being heated in the preheating region 21. The conveyance speed of the raw material polyolefin sheet 10 is normally about 1 to 100 m/minute, preferably 3 to 40 m/minute.

In the preheating region 21, the raw material polyolefin sheet 10 is heated to a temperature sufficient to stretch the raw material polyolefin sheet 10.

The preheating temperature in the preheating region 21 is preferably (Tg−20) to (Tg+30)° C. when the thermoplastic resin contained in the raw material polyolefin sheet 10 is an amorphous resin. Tg represents a glass-transition temperature.

On the other hand, the preheating temperature is preferably (Tm−40) to (Tm+20)° C. when the thermoplastic resin contained in the raw material polyolefin sheet 10 is a crystalline resin. Tm represents a melting point. The preheating temperature herein refers to a temperature of an atmosphere in the preheating region 21 of the heating furnace 20.

The preheated raw material polyolefin sheet 10 moves from the preheating region 21 to stretching regions 22 and 23 in the rear stage. In stretching regions 22 and 23, the raw material polyolefin sheet 10 is stretched in a width direction (direction perpendicular to the film conveyance direction) while being heated. The temperature of an atmosphere in each of stretching regions 22 and 23 is set so as to satisfy the above-described conditions.

When the raw material polyolefin sheet 10 is formed of a polyethylene-based resin, the raw material polyolefin sheet 10 can be more uniformly stretched by laterally stretching the preheated raw material polyolefin sheet 10 at a temperature lower than the preheating temperature. As a result, a stretched film excellent in thickness and phase difference can be obtained. When the raw material polyolefin sheet 10 is formed of a polyethylene-based resin, the temperature of an atmosphere in each of stretching regions 22 and 23 is preferably lower by 5 to 30° C., more preferably lower by 10 to 25° C., than the temperature of the preheating region 21.

Lateral stretching of the raw material polyolefin sheet 10 in stretching regions 22 and 23 is performed by extending in a width direction (direction perpendicular to the film conveyance direction) chucks C that fix the raw material polyolefin sheet 10. That is, the raw material polyolefin sheet 10 is drawn and stretched in the width direction as chucks C extend in the width direction in stretching regions 22 and 23 while moving in the arrow direction (film conveyance direction). Finally, the raw material polyolefin sheet 10 is laterally stretched from the width $F_1$ to a width $F_2$.

The raw material polyolefin sheet 10 moves to the heat fixing region 24 in the rear stage after being stretched in stretching regions 22 and 23.

In the heat fixing region 24, the sheet is heated to a predetermined temperature while the width $F_2$ after stretching is maintained. Consequently, thermal stability of the stretched film 11 can be improved. The heat-fixing temperature (the temperature of an atmosphere of the heat fixing region 24) may be identical to or different from that of the stretching region 23 in the front stage, but when a temperature much higher than a temperature applied at the time of stretching the sheet into the film is applied, the stretched film is easily shrunk, and therefore the heat fixing temperature is preferably between a temperature identical to the stretching temperature in the stretching region 23 and a temperature higher by 30° C. than the stretching temperature.

The stretched film 11 is discharged from the heating furnace 20 after passing through the heat fixing region 24. Consequently, the stretched film 11 stretched in the lateral direction (film width direction) can be obtained.

In the production method of the present invention, among a plurality of stretching regions where tenter stretching is performed, at least two stretching regions have different film widening speeds, the temperature of the stretching region having a high film widening speed is set lower than that of the stretching region having a low film widening speed in the at least two stretching regions, and a stretching region having the highest film widening speed is situated in the front stage with respect to a stretching region having the lowest film widening speed.

Figure 2:
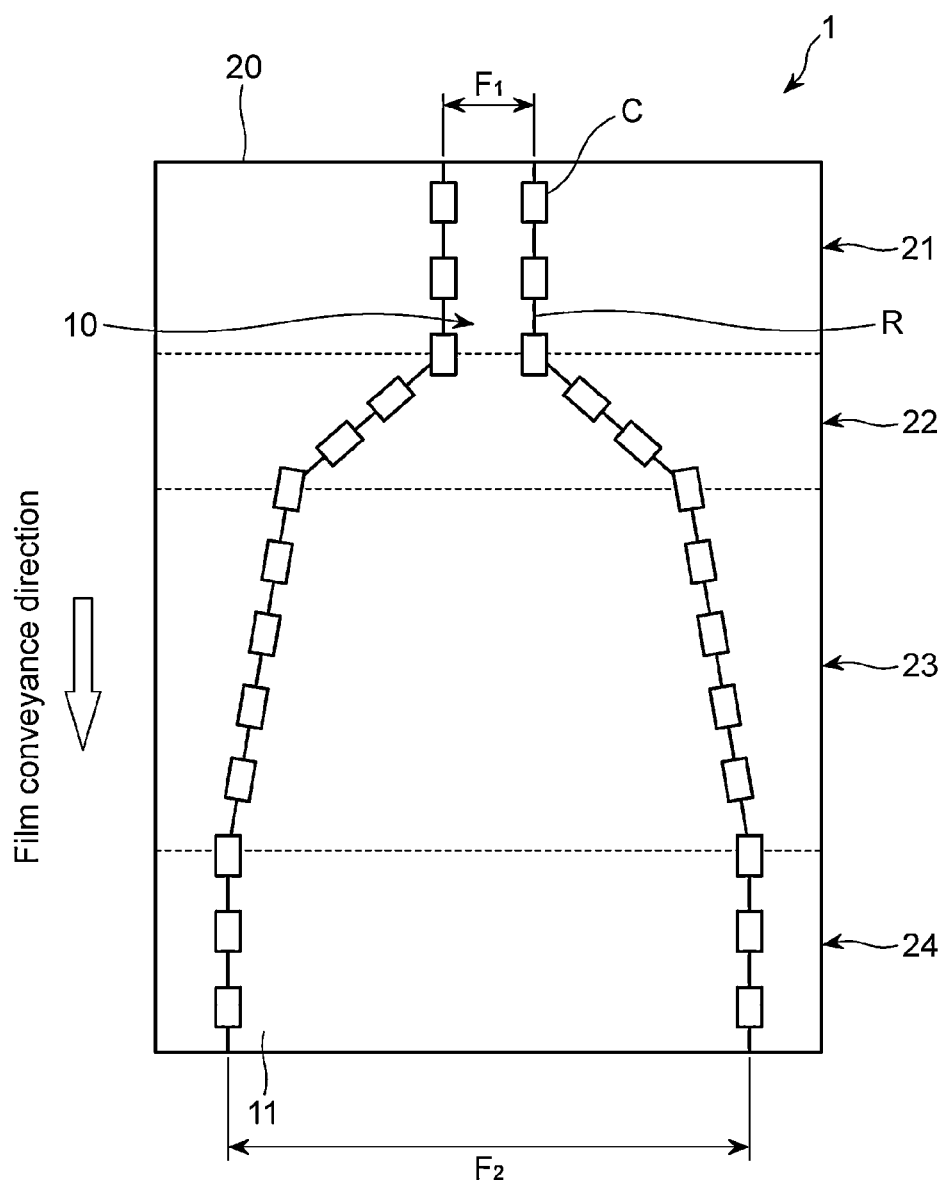
FIG. 2 is a view (plan view) for explaining a film stretching step with a uniaxial tenter type stretching machine.
Figure 3:
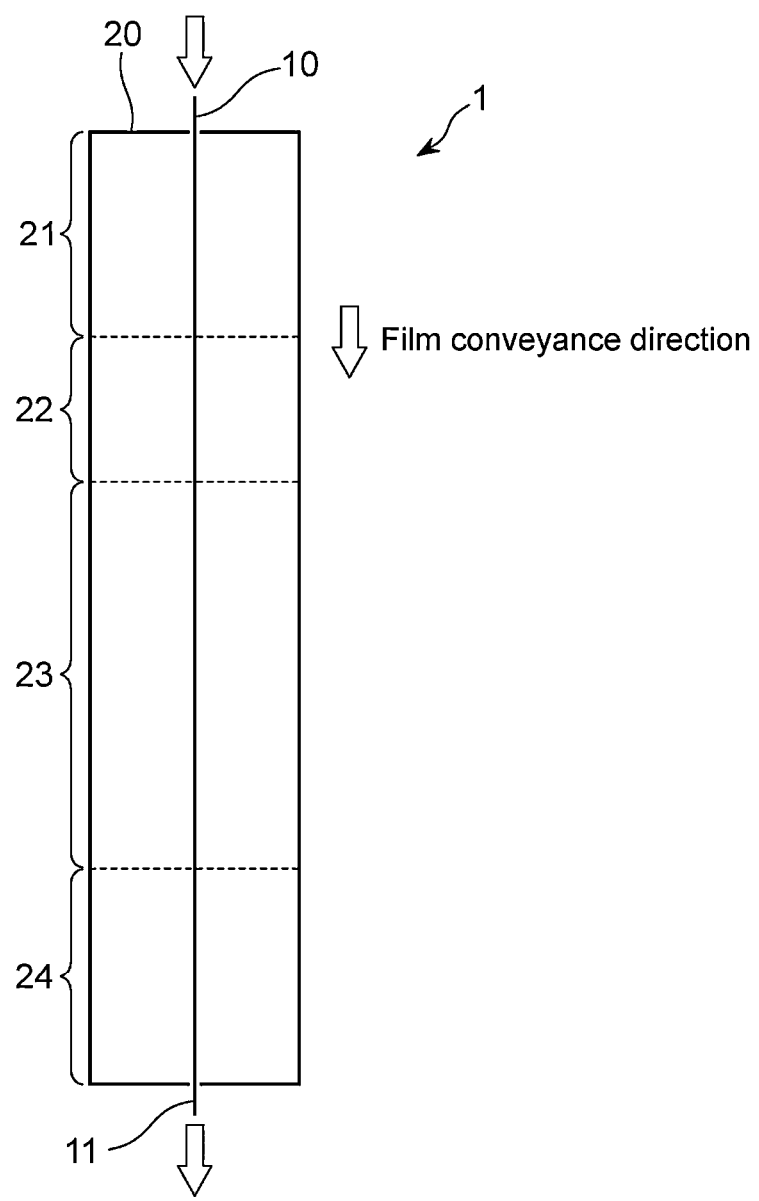
FIG. 3 is a view (sectional view) for explaining a film stretching step with a uniaxial tenter type stretching machine.

That is, when as shown in FIGS. 2 and 3, there exist two stretching regions where tenter stretching is performed, the film widening speed in the stretching region 22 in the front stage is higher than the film widening speed of the stretching region 23 in the rear stage, and the stretching region 22 in the front stage has a temperature lower than that of the stretching region 23 in the rear stage.

In the production method of the present invention, the stretching region situated in the front stage and having the highest film widening speed is set at a temperature lower than that of the stretching region situated in the rear stage and having the lowest film widening speed. When the temperature is set as described above, film productivity can be improved by achieving a high film widening rate in the front-stage stretching region having a high film widening speed (low temperature). Further, in the rear-stage stretching region having a low film widening speed (high temperature), the film is slowly widened, and therefore closure of pores of the film, which easily occurs when the film widening speed is excessively high, can be suppressed, so that a high ion permeability of the film can be maintained.

FIGS. 2 and 3 show an example in which there exist two stretching regions where tenter stretching is performed, but in the case where there exist three or more stretching regions, at least two stretching regions thereof should satisfy the above-described conditions of the production method of the present invention. Therefore, there may exist regions having the same temperature and different film widening speeds, or regions having different temperatures and the same film widening speed.

The width stretching ratio ($F_2/F_1$ ratio in FIG. 2) of the raw material polyolefin sheet is preferably 2 to 10. The width stretching ratio is more preferably 4 to 8 for further improving the uniformity of the thickness and phase difference of the resulting stretching film.

The closure of pores at the time of film stretching easily occurs particularly when the thickness of the film decreases. Therefore, it is preferred that the raw material polyolefin sheet is stretched to a thickness of 5% or higher and 40% or lower (preferably 10% or higher and 30% or lower) of the initial value when supplied to the stretching region having the lowest film widening speed. By performing stretching under the above-mentioned conditions, closure of pores at the time of film stretching is suppressed, so that a film having a proper porosity and a pore diameter can be obtained.

A difference in temperature between the stretching region having the highest film widening speed and the stretching region having the lowest film widening speed (difference in temperature between the stretching region 22 and the stretching region 23 in FIG. 2) is preferably 10° C. or higher, more preferably 15° C. or higher, further preferably 20° C. or higher.

By providing such a temperature difference, quality of the film can be improved to enhance the ion permeability of the film.

The film widening speed is a speed at which the film is expanded in a width direction (direction orthogonal to the film conveyance direction) per unit time, and when the tenter stretching machine is a uniaxial or simultaneous biaxial stretching machine, the film widening speed S can be defined by the following formula (1):

$$\text{film widening speed } S = V \times W/L \quad (1)$$

wherein L represents a distance in a film conveyance direction in each stretching region, W represents a difference between distances between intersections of lines orthogonal to the film conveyance direction and a tenter rail in each stretching region, and V is a speed at which a film passes through each stretching region in a conveyance direction.

The definition of the film widening speed S defined by the formula (1) will be described below with reference to the drawings.

Figure 4:
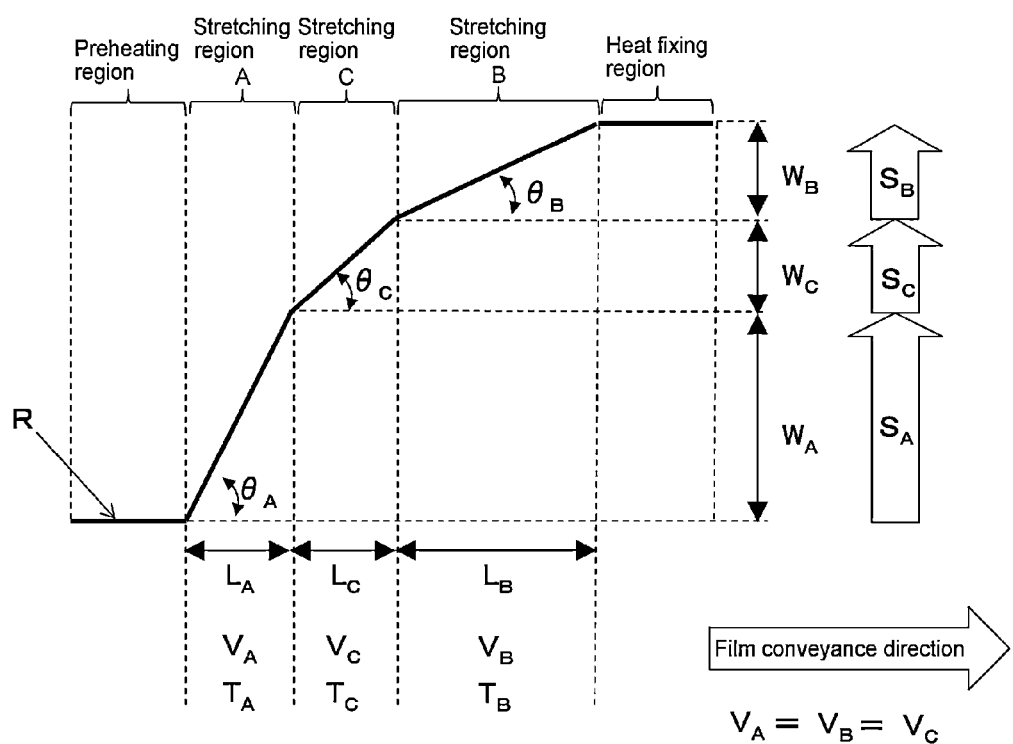
FIG. 4 is a view for explaining a film widening speed S defined by the formula (1), and shows a case where the tenter type is uniaxial stretching.

FIG. 4 is a view for explaining the film widening speed S when the film stretching method is uniaxial stretching. In FIG. 4, for simplifying the explanations, only one tenter rail R is shown, and the other tenter rail and components other than the tenter rail are not illustrated.

L represents a distance in the film conveyance direction in each stretching region, and corresponds to a length of each stretching region. Therefore, L depends on a structure of a tenter stretching machine to be used. Ls in stretching regions A, B and C are $L_A$, $L_B$ and $L_C$, respectively.

W represents a difference between distances between intersections of lines orthogonal to a film conveyance direction and a tenter rail in each stretching region. That is, W defines an amount in which the film is stretched in a width direction. Ws in stretching regions A, B and C are $W_A$, $W_B$ and $W_C$, respectively.

V represents a speed at which the film passes in a conveyance direction through each stretching region, i.e. a film conveyance speed. Vs in stretching regions A, B and C are $V_A$, $V_B$ and $V_C$, respectively.

Angles of the tenter rail R with respect to the film conveyance direction in stretching regions A, B and C are $\theta_A$, $\theta_B$ and $\theta_C$, respectively.

$S_S$ defined by the formula (1) in stretching regions A, B and C are $S_A$, $S_B$ and $S_C$, respectively. Temperatures in stretching regions A, B and C are $T_A$, $T_B$ and $T_C$, respectively.

The film widening speed is a speed at which the film is expanded in a lateral direction (width direction) per unit time. The distance between chucks C on the tenter rail R is fixed, and therefore when the tenter rail R forms a certain angle θ with respect to the film conveyance direction, the film widening speed S is proportional to the film conveyance speed V, so that the film widening speed S increases as the film conveyance speed V increases. The tenter rail R gets away from the film center more steeply as the angle θ becomes larger, and therefore the film widening speed S increases as the angle θ increases.

Here, in the formula (1), W/L corresponds to tan θ, and therefore as shown in the formula (1), S, i.e. a product of W/L and the speed V in each stretching region, corresponds to a speed at which the film is expanded in a lateral direction (width direction) per unit time, namely the film widening speed.

When the film widening speed is defined by S of the formula (1), there are provided the following advantages: (i) the film widening speed can be applied even when there is a difference in L, i.e. the widths of the stretching regions are mutually different; (ii) the film widening speed can be applied even when there is a difference in W, i.e. the stretching amounts in the width direction in the stretching regions are mutually different; (iii) the film widening speed can be applied even when there is a difference in θ, i.e. the angles formed by the tenter rail R with respect to the film conveyance direction are mutually different; and so on.

In the case of uniaxial stretching, the speed V at which the film is conveyed through each region from the front stage to the rear stage is fixed, so that the relationship of $V_A = V_B = V_C$ is satisfied. Therefore, the film widening speed S is in a proportional relationship with tan θ=W/L. Accordingly, in three stretching regions A, B and C in FIG. 4, the relationship of $S_A > S_C > S_B$ is satisfied when $W_A/L_A > W_C/L_C > W_B/L_B$.

In FIG. 4, the relationship of $S_A > S_C > S_B$ is satisfied, and therefore when the temperature $T_A$ of the stretching region A having the highest S is lower than the temperature $T_B$ of the stretching region B having the lowest S, the requirements of the production method of the present invention described above are satisfied.

The film widening speed S defined by the formula (1) can be applied even when the tenter stretching method is simultaneous biaxial stretching.

Figure 5:
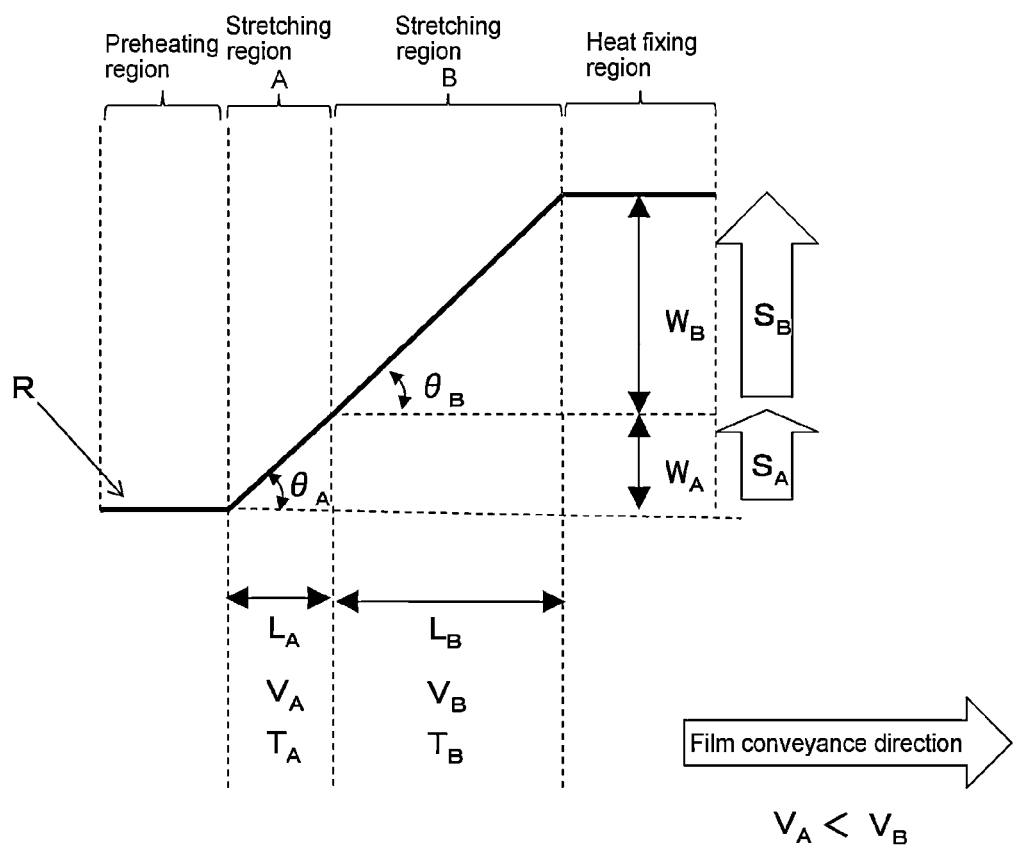
FIG. 5 is a view for explaining a film widening speed S defined by the formula (1), and shows a case where the tenter type is simultaneous biaxial stretching.

Film stretching where the tenter stretching method is simultaneous biaxial stretching will be described with reference to FIG. 5. In FIG. 5, two stretching regions A and B are shown as stretching regions for simplifying the explanations.

The simultaneous biaxial stretching method is a method in which a film is stretched not only in a width direction but also in a film conveyance direction (longitudinal direction) in each stretching region, with the stretching regions A and B having different film conveyance speeds $V_A$ and $V_B$. Here, the film conveyance speed V in the simultaneous biaxial stretching method means an average conveyance speed in each stretching region.

In the case of the simultaneous biaxial stretching method, the tenter rail R gets away from the film center more steeply as the angle θ becomes larger as in the uniaxial stretching method, but the large/small relationship of the film widening speed S varies depending on the film conveyance speed V. For example, in FIG. 5, even in the case of $\theta_A = \theta_B$, the relationship of $S_A < S_B$ is satisfied when $V_A < V_B$.

For S defined in the above formula (1), the film widening speed $S_A$ in the stretching region A is preferably two times or more, more preferably four times or more, further preferably five times or more of the film widening speed $S_B$ in the stretching region B.

The absolute value of the film widening speed S defined in the above formula (1) is appropriately determined in consideration of a film material and a required stretching ratio, but is normally 0.1 to 50 m/min, preferably 0.3 to 20 m/min.

The physical properties of the raw material polyolefin sheet and the polyolefin porous film obtained by the production method of the present invention will be described below.

<Raw Material Polyolefin Sheet>

Examples of the polyolefin in the raw material polyolefin sheet include high molecular weight homopolymers or copolymers obtained by polymerizing ethylene, propylene, 1-butene, 4-methyl-1-pentene, 1-hexene and the like. Among them, ultrahigh molecular weight polyolefins having a weight average molecular weight of 500000 or more are preferred, and particularly, high molecular weight polyethylene composed principally of ethylene and having a weight average molecular weight of 1000000 or more.

The ratio of the polyolefin component in the raw material polyolefin sheet is essentially 50% by weight or more, preferably 90% by weight or more, more preferably 95% by weight or more, based on the total weight of the raw material polyolefin sheet.

Preferably, the polyolefin component of the raw material polyolefin sheet includes a high molecular weight polyolefin component having a weight average molecular weight of $5 \times 10^5$ to $150 \times 10^5$. Particularly, when a polyolefin component having a weight average molecular weight of 1000000 or more is included, the strength of the polyolefin porous film (after the raw material polyolefin sheet is stretched) tends to be improved.

Preferably, the polyolefin component of the raw material polyolefin sheet includes a polyolefin wax having a weight average molecular weight of 2000 or less together with a high molecular weight polyolefin component having a weight average molecular weight of $5 \times 10^5$ to $150 \times 10^5$.

The polyolefin wax acts as a plasticizer in processing of a high molecular weight polyolefin, so that the high molecular weight polyolefin component easily moves, and crystallization of the high molecular weight polyolefin is promoted, leading to an increase in strength of the entire film.

The porosity of the raw material polyolefin sheet is preferably 30 to 50% by volume. When the porosity of the raw material polyolefin sheet is less than 30% by volume, it is difficult to increase the porosity of the stretched porous film, and when the porosity of the raw material polyolefin sheet is more than 50% by volume, the strength of the stretched porous film may not be sufficiently maintained.

Examples of the method for producing a raw material polyolefin sheet, a raw material of a polyolefin porous film, include a method in which for ensuring that a raw material polyolefin has voids (pores), a resin composition formed of a polyolefin is filled with an extractable filler, and formed into a sheet with a predetermined thickness, followed by extracting and removing the filler. In this case, the pore diameter of the voids (pores) of the raw material polyolefin sheet is determined by the particle diameter of the filler.

<Polyolefin Porous Film>

The polyolefin porous film obtained by the production method of the present invention is a porous film which has a structure having coupled pores therein and which contains a polyolefin as a principal component, where a gas or a liquid can permeate from one surface to the other surface through the coupled pores.

The thickness of the porous film is preferably 4 to 40 μm, more preferably 7 to 30 μm. When the thickness is less than 4 μm, the porous film may have poor handling characteristics, or insulation of positive and negative electrodes may not be maintained when the porous film is used as a separator for a battery. On the other hand, when the thickness is more than 40 μm, the battery capacity may be reduced when the porous film is used as a separator for a battery.

The basis weight of the porous film is normally 4 to 20 g/m², preferably 5 to 12 g/m². When the basis weight is less than 4 g/m², the porous film may have poor strength and handling characteristics, or insulation between positive and negative electrodes may not be maintained when the film is used as a separator for a battery. On the other hand, when the basis weight is more than 20 g/m², the weight energy density may be reduced to cause a capacity shortage when the porous film is used as a separator for a battery.

The ion permeability of the porous film can be evaluated by a Gurley gas permeability.

The gas permeability of the porous film is 250 seconds/100 cc or less, preferably 220 seconds/100 cc or less, more preferably 200 seconds/100 cc or less in terms of a Gurley value. When the porous film has a gas permeability falling within the above-described range, the porous film can exhibit an ion permeability required when the porous film is used as a separator for a high-power secondary battery such as an on-board battery.

On the other hand, for maintaining insulation between positive and negative electrodes, the gas permeability is preferably 30 seconds/100 cc or more, more preferably 50 seconds/100 cc or more.

The porosity of the porous film is 43% by volume or more, preferably 45% by volume or more, more preferably 47% by volume or more. When the porous film has a porosity falling within the above-described range, the porous film is suitable as a separator for the on-board battery because the retention amount of an electrolyte solution can be increased, and a high ion permeability can be secured.

The porosity of the porous film is 80% by volume or less, preferably 75% by volume or less because a shutdown function can be reliably obtained.

Further, the pore diameter of the porous film is preferably 0.073 μm or less, more preferably 0.071 μm or less, especially preferably 0.069 μm or less because when the porous film is used as a separator for a battery, ingress of particles in positive and negative electrodes can be prevented, and a short circuit by dendrite generated in the negative electrode can be prevented.

The ratio of the average pore diameter and the porosity (average pore diameter (μm)/porosity) in the porous film is preferably 0.1 to 0.16, more preferably 0.12 to 0.15. When the ratio falls within the above-mentioned range, occurrence of a short circuit by dendrite is easily suppressed while the ion permeability is secured.

The porous film has pores having an ion permeability, but is melted and made non-porous by overheat, and therefore can be used as a separator for a battery, which has a shutdown function.

A laminated porous film having a polyolefin porous film will be described below.

The laminated porous film of the present invention has a heat resistant layer formed on one surface or both surfaces of the polyolefin porous film (hereinafter, referred to as a "base porous film" in some cases in description of the laminated porous film).

The laminated porous film of the present invention is suitable as a separator for a battery, and if excessive heat generation occurs in the battery, the base porous film is melted and made non-porous, so that a shutdown function is exhibited, and the heat resistant layer exhibits functions of heat resistance and dimensional stability to a high temperature at the time of excessive heat generation.

<Base Porous Film>

Since the base porous film is a base of the laminated porous film, and the above-described polyolefin porous film is used as the base porous film, descriptions thereof are omitted here.

<Heat Resistant Layer>

The heat resistant layer is a porous layer having fine particles as a principal component and formed by bonding the fine particles by a binder polymer, and is laminated on a surface of the base porous film.

The heat resistant layer is not particularly limited as long as it has functions of heat resistance and dimensional stability to a high temperature at the time of excessive heat generation, and a nitrogen-containing aromatic polymer such as polyamide or polyimide may be used, but a porous layer having fine particles as a principal component and formed by bonding the fine particles by a binder polymer is preferably used.

The preferred heat resistant layer, i.e. a porous layer having fine particles as a principal component and formed by bonding the fine particles by a binder polymer (hereinafter, the heat resistant layer is referred to as a "heat resistant porous layer" in some cases) will be described more in detail below.

As fine particles that form the heat resistant porous layer, inorganic fine particles generally called a filler may be used. Specific examples include fine particles formed of inorganic substances such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite and glass. Among them, inorganic oxides are preferred, and magnesium oxide, titanium oxide and alumina are more preferred, with alumina being especially preferred, as fine particles from the viewpoint of heat resistance and chemical stability. These fine particles may be used alone or in combination of two or more thereof.

The average particle diameter of fine particles is preferably 3 µm or less, more preferably 1 µm. Examples of the shape of the fine particle include a spherical shape and a gourd shape. Methods for determining an average particle diameter of fine particles include a method in which 25 particles are randomly extracted, a particle diameter (diameter) is measured for each particle using a scanning electron microscope (SEM), and an average of 10 particle diameters is calculated, and a method in which a BET specific surface area is measured, and the particle is approximated to a spherical shape to calculate an average particle diameter. In calculation of an average particle diameter using a SEM, a length in a direction corresponding to the largest length in a particle is defined as a particle diameter of the particle when the shape of the fine particle is not spherical.

Two or more kinds of fine particles having different particle diameters and/or specific surface areas may be used in combination.

The binder polymer to be used for formation of a heat resistant porous layer has a role of binding fine particles that form the porous layer, and fine particles and a polyolefin porous film. Such a binder polymer is preferably a polymer which is insoluble in an electrolyte of a battery and electrochemically stable under use conditions of the battery.

Examples of the binder polymer include polyolefins such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; rubbers such as styrene-butadiene copolymers and hydrogenates thereof, methacrylic acid ester copolymers, acrylonitrile-acrylic acid ester copolymers, styrene-acrylic acid ester copolymers, ethylene propylene rubber and polyvinyl acetate; resins having a melting point or glass transition temperature of 180° C. or higher, such as polyphenylene ether, polysulfone, polyether sulfone, polyphenylene sulfide, polyether imide, polyamide imide, polyether amide, polyamide and polyester; and water-soluble polymers such as polyvinyl alcohol, polyethylene glycol, cellulose ether, sodium alginate, polyacrylic acid, polyacrylamide and polymethacrylic acid.

Among them, water-soluble polymers such as cellulose ether, sodium alginate and polyacrylic acid are preferred from the viewpoint of process and environmental loads because water can be used as a solvent. Among the water-soluble polymers, cellulose ether is preferably used.

Specific examples of the cellulose ether include carboxymethyl cellulose (CMC), hydroxyethyl cellulose (HEC), carboxyethyl cellulose, methyl cellulose, ethyl cellulose, cyanoethyl cellulose and oxyethyl cellulose, CMC and HEC which are excellent in chemical stability are particularly preferred.

Resins having a melting point or glass transition temperature of 180° C. or higher, such as polyphenylene ether, polysulfone, polyether sulfone, polyphenylene sulfide, polyether imide, polyamide imide, polyether amide and polyester are preferred because they have high heat resistance and improve the heating shape maintenance ratio of a laminated porous film. Among the heat resistant resins, polyether imide, polyamide imide, polyether amide and polyamide are preferred, with polyamide being further preferred.

The thickness of the heat resistant porous layer is determined so that the ion permeability is not hindered, and functions of heat resistance and dimensional stability to a high temperature can be secured. When the thickness of the heat resistant porous layer is excessively large, load characteristics of the non-aqueous electrolyte battery may be deteriorated when the porous film is used as a separator, and when the thickness of the heat resistant porous layer is excessively small, the separator may be shrunk as thermal shrinkage of the polyolefin porous film cannot be sustained if abnormal heat generation occurs in the battery due to an accident etc.

The specific thickness of the heat resistant porous layer depends on the number of laminated layers in the laminated porous film, but is normally 0.1 µm or more and 20 µm or less, preferably 2 µm or more and 15 µm or less when the heat resistant porous layer is formed on one surface or both surfaces of the base porous film (the value represents the total thickness in the case where the heat resistant porous layer is formed on both surfaces).

The porosity of the heat resistant porous layer is preferably 20 to 85% by volume, more preferably 40 to 75% by volume. When the porosity of the heat resistant porous layer is excessively low, the ion permeability may be deteriorated, and when the porosity of the heat resistant porous layer is excessively high, the strength of the heat resistant porous layer is reduced, so that the separator may be shrunk as thermal shrinkage of the polyolefin porous film cannot be sustained if abnormal heat generation occurs in the battery due to an accident etc.

The average pore diameter of the heat resistant porous layer is preferably 0.005 to 0.3 µm, more preferably 0.01 to 0.2 µm. When the average pore diameter is excessively small, the ion permeability may be deteriorated, and when the average pore diameter is excessively large, a short circuit easily occurs due to formation of dendrite in the electrode.

Examples of the method for producing a laminated porous film include a method in which a coating solution containing fine particles, a binder polymer and a solvent (dispersion medium) is applied directly onto the base porous film and the solvent (dispersion medium) is removed; a method in which a coating solution is applied onto an appropriate support, a solvent (dispersion medium) is removed to form a porous layer, the porous layer is contact-bonded to a base porous film, and the support is then peeled off; a method in which a coating solution is applied onto an appropriate support, the support is then contact-bonded to a base porous film, and the base porous film is peeled off from the support, and a solvent (dispersion medium) is then removed; and a method in which a base porous film is immersed in a coating solution to perform dip coating, and a solvent (dispersion medium) is then removed. As the support, a resin film, a metallic belt, a drum or the like may be used.

When the heat resistant porous film is laminated on both surfaces of the base porous film, a sequential lamination method in which the heat resistant layer is formed on one surface, followed by laminating the heat resistant layer on the other surface, and a simultaneous lamination method in which the heat resistant layer is simultaneously formed on both surfaces of the base porous film may be employed.

The solvent (dispersion medium) for dispersing fine particles and a binder polymer is not limited as long as it is a solvent in which fine particles and a binder polymer can be uniformly and stably dissolved or dispersed, and the solvent (dispersion medium) is appropriately selected in consideration of fine particles and a resin to be used. Specific examples may include water, alcohols such as methanol, ethanol and isopropanol, toluene, xylene, hexane, N-methylpyrrolidone, N,N-dimethylacetamide and N,N-dimethylformamide.

The method for dispersing fine particles and a binder polymer to obtain a coating solution is not limited as long as it is a method by which dispersion liquid characteristics required for forming a desired heat resistant porous layer is obtained, and examples thereof may include a mechanical stirring method, an ultrasonic dispersion method, a high pressure dispersion method and a medium dispersion method. The coating solution may contain a dispersant, a plasticizer, a pH adjusting agent and the like as components other than fine particles and a binder polymer within the bounds of not impairing the purpose of the present invention.

The method for applying the coating solution onto a base porous film or a support is not particularly limited as long as it is a method capable of achieving a required basis weight and coating area, and a previously known method may be employed. Examples include, a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a die coater method, a screen printing method and a spray coating method.

The method for removing a solvent (dispersion medium) is not particularly limited, but is generally a method of removal by drying.

The drying method may be a method such as natural drying, drying by blowing air, drying by heating or drying under reduced pressure. A drying operation may be performed after the solvent (dispersion medium) of the coating solution is replaced with another solvent.

As a suitable method, the following method may be shown as an example.

Another solvent (hereinafter, referred to as a "solvent X"), which is soluble in a solvent (dispersion medium) used for preparation of a coating solution and which does not dissolve a binder polymer contained in the coating solution, and is easily evaporated, is provided, a base porous film or support coated with the coating solution is immersed in the solvent, the used solvent (dispersion medium) in the filmy coating solution on the base porous film or support is replaced with the solvent X, and the solvent X is then evaporated. In this method, a solvent (dispersion medium) can be efficiently removed.

When heat is applied at the time of removing the solvent (dispersion medium) of the coating solution or the solvent X from the base porous film coated with the coating solution, it is necessary to avoid reduction of the gas permeability due to shrinkage of pores of the base porous film.

EXAMPLES

The present invention will be further specifically described below with reference to examples, but the present invention is not intended to be limited to these examples.

In examples and comparative examples, physical properties etc. of the film were measured using the following methods.

(1) Measurement of Thickness (Unit: μm)

A film thickness was measured in accordance with JIS Standard (K7130-1992).

(2) Gurley Gas Permeability (Unit: sec/100 cc)

The gas permeability of the film was measured in accordance with JIS P8117 using a digital timer type Gurley type densometer manufactured by TOYO SEIKI SEISAKU-SHO, LTD.

(3) Porosity (Unit: % by Volume)

The film was cut to a 10 cm×10 cm square, and the weight: W (g) and the thickness: D (cm) were measured. Weights of materials in a sample were determined by calculation, the weight: Wi (g) of each material was divided by a true specific gravity to calculate the volume of each material, and the porosity (% by volume) was determined in accordance with the following equation.

$$\text{Porosity (\% by volume)} = 100 - [\{(W1/\text{true specific gravity } 1) + (W2/\text{true specific gravity } 2) + \ldots + (Wn/\text{true specific gravity } n)\} / (10 \times 10 \times D)] \times 100.$$

(4) Average Pore Diameter

In accordance with the provisions of JIS K3832, an average pore diameter was determined with Fluorinert FC-40 (manufactured by Sumitomo 3M Limited) as an impregnating solution using Automated Capillary Flow Porometer (manufactured by POROUS MATERIALS INC.).

<Preparation of Raw Material Polyolefin Sheet>

Seventy (70) % by weight of an ultrahigh molecular weight polyethylene powder (340M manufactured by Mitsui Chemicals, Inc; molecular weight: 3200000) and 30% by weight of a polyethylene wax having a weight average molecular weight of 1000 (FNP-0115 manufactured by NIPPON SEIRO CO., LTD.) were provided, and to 100 parts by weight of the total amount of the ultrahigh molecular weight polyethylene and polyethylene wax were added 0.4% by weight of an antioxidant (Irg1010 manufactured by Ciba Specialty Chemicals Inc.), 0.1% by weight of an antioxidant (P168 manufactured by Ciba Specialty Chemicals Inc.) and 1.3% by weight of sodium stearate. Calcium carbonate having an average particle diameter of 0.1 μm (manufactured by MARUO CALCIUM CO., LTD.) was further added in an amount of 38% by volume based on the total volume, and these components were mixed in a powdered form using a Henschel mixer, followed by melting and kneading the mixture by a twin screw kneader to obtain a polyolefin resin composition. The polyolefin resin composition was rolled by a pair of rolls with a surface temperature of 150° C. to prepare a sheet. The sheet was immersed in an aqueous hydrochloric acid solution (hydrochloric acid: 4 mol/L, nonionic surfactant: 0.5% by weight) to dissolve and remove calcium carbonate, thereby obtaining a raw material polyolefin sheet.

As a tenter type stretching machine, a uniaxial stretching tenter type stretching machine manufactured by ICHIKIN Co., Ltd. was used.

The stretching region of the tenter type stretching machine was divided into two regions: a stretching region A and a stretching region B, and a stretching operation was performed with the film widening speed and the temperature changed between the stretching regions. Tenter rails of the stretching regions were set so as to form a straight line.

As rail patterns, the three patterns in the table below were set. For L, W and V in the Table 1 below, L represents a distance in a film conveyance direction in each stretching region, W represents a difference between positions, in a direction perpendicular to the film conveyance direction, at which the tenter rail passes through an entrance and an exit of each region, and V represents a speed at which the film passes through in each region in the conveyance direction. The film widening speed S in each region is a value calculated from the equation of S=V×W/L.

TABLE 1

| Rail pattern | | L mm | W mm | V m/min | S m/min |
|---|---|---|---|---|---|
| Pattern 1 | Stretching region A | 2500 | 1285 | 15 | 7.7 |
| | Stretching region B | 2500 | 218 | 15 | 1.3 |
| Pattern 2 | Stretching region A | 2500 | 752 | 15 | 4.5 |
| | Stretching region B | 2500 | 752 | 15 | 4.5 |
| Pattern 3 | Stretching region A | 2500 | 360 | 15 | 2.2 |
| | Stretching region B | 2500 | 1143 | 15 | 6.9 |

Reference Example 1

As a film production method as a reference, a film was produced under stretching conditions of a fixed film widening speed S and film stretching temperature.

First, the rail pattern of a stretching machine was set to pattern 2 in which both regions had the same film widening speed S, the temperatures of the stretching region A and the stretching region B were each set to 105° C., the temperatures of a preheating region and a heat fixing region were each set to 120° C., and a raw material polyolefin sheet was stretched to obtain a polyolefin porous film of Reference Example 1.

Example 1

The rail pattern was set to patten 1, the temperatures of the stretching region A was set to 95° C., the temperature of the stretching region B was set to 115° C., the temperatures of the preheating region and the heat fixing region were each set to 120° C., and a raw material polyolefin sheet was stretched to obtain a polyolefin porous film of Example 1.

Example 2

The rail pattern was set to pattern 1, the temperatures of the stretching region A was set to 100° C., the temperature of the stretching region B was set to 110° C., the temperatures of the preheating region and the heat fixing region were each set to 120° C., and a raw material polyolefin sheet was stretched to obtain a polyolefin porous film of Example 2.

Comparative Example 1

The rail pattern was set to pattern 1, the temperatures of the stretching region A and the stretching region B were each set to 105° C., the temperatures of a preheating region and a heat fixing region were each set to 120° C., and a raw material polyolefin sheet was stretched to obtain a polyolefin porous film of Comparative Example 1.

Comparative Example 2

The rail pattern was set to pattern 1, the temperatures of the stretching region A was set to 115° C., the temperature of the stretching region B was set to 95° C., the temperatures of the preheating region and the heat fixing region were each set to 120° C., and a raw material polyolefin sheet was stretched to obtain a polyolefin porous film of Comparative Example 2.

Comparative Example 3

The rail pattern was set to pattern 2, the temperatures of the stretching region A was set to 95° C., the temperature of the stretching region B was set to 115° C., the temperatures of the preheating region and the heat fixing region were each set to 120° C., and a raw material polyolefin sheet was stretched to obtain a polyolefin porous film of Comparative Example 3.

Comparative Example 4

The rail pattern was set to pattern 2, the temperatures of the stretching region A was set to 115° C., the temperature of the stretching region B was set to 95° C., the temperatures of the preheating region and the heat fixing region were each set to 120° C., and a raw material polyolefin sheet was stretched to obtain a polyolefin porous film of Comparative Example 4.

Comparative Example 5

The rail pattern was set to pattern 3, the temperatures of the stretching region A was set to 95° C., the temperature of the stretching region B was set to 115° C., the temperatures of the preheating region and the heat fixing region were each set to 120° C., and a raw material polyolefin sheet was stretched to obtain a polyolefin porous film of Comparative Example 5.

Comparative Example 6

The rail pattern was set to pattern 3, the temperatures of the stretching region A was set to 115° C., the temperature of the stretching region B was set to 95° C., the temperatures of the preheating region and the heat fixing region were each set to 120° C., and a raw material polyolefin sheet was stretched to obtain a polyolefin porous film of Comparative Example 6.

The thickness and porosity of the raw material sheet, the film stretching conditions, and the physical properties of the obtained polyolefin porous film are collectively shown in Table 2.

TABLE 2

| Test Examples | Raw material sheet Thickness [μm] | Porosity [% by volume] | Stretching rail pattern | Stretching conditions Temperature of stretching region A [° C.] | Temperature of stretching region B [° C.] | Physical properties of film Thickness [μm] | Gurley gas permeability [sec/100 cc] | Porosity [% by volume] | Average particle diameter [μm] | Average pore diameter/ porosity |
|---|---|---|---|---|---|---|---|---|---|---|
| Reference Example 1 | 63 | 39 | Pattern 2 | 105 | 105 | 13.8 | 225 | 46.2 | 0.075 | 0.162 |
| Example 1 | 69 | 39 | Pattern 1 | 95 | 115 | 15.4 | 182 | 48.0 | 0.066 | 0.138 |
| Example 2 | 69 | 39 | Pattern 1 | 100 | 110 | 15.2 | 203 | 46.8 | 0.067 | 0.142 |
| Comparative Example 1 | 69 | 39 | Pattern 1 | 105 | 105 | 14.6 | 280 | 44.5 | 0.066 | 0.147 |
| Comparative Example 2 | 69 | 39 | Pattern 1 | 115 | 95 | 12.6 | 754 | 36.4 | 0.058 | 0.159 |
| Comparative Example 3 | 69 | 39 | Pattern 2 | 95 | 115 | 15.1 | 220 | 47.0 | 0.070 | 0.149 |
| Comparative Example 4 | 63 | 39 | Pattern 2 | 115 | 95 | 13.4 | 296 | 43.5 | 0.070 | 0.161 |
| Comparative Example 5 | 63 | 39 | Pattern 3 | 95 | 115 | 13.3 | 424 | 42.8 | 0.070 | 0.161 |
| Comparative Example 6 | 69 | 39 | Pattern 3 | 115 | 95 | 13.6 | 372 | 40.9 | 0.062 | 0.152 |

As compared to Reference Example 1 in which the film widening speed and the temperature in the stretching region A and the stretching region B are fixed, Example 1 and Example 2 in which the film widening speed in the stretching region A in the front stage is higher than that in the stretching region B and the stretching region A has a temperature lower than that of the stretching region B evidently have a small Gurley gas permeability, and have an average pore diameter/porosity ratio lower than that of Reference Example 1. From this, it is apparent that in Example 1 and Example 2, occurrence of a short circuit by dendrite is easily suppressed while the ion permeability is secured.

On the other hand, it is apparent that in Comparative Example 1 and Comparative Example 3 in which the rail pattern is the same pattern 1 as in Example 1 and the temperature conditions are different from those in Example 1 evidently have a large Gurley gas permeability.

On the other hand, Comparative Example 3 in which the stretching speed is fixed (pattern 2) and the temperature conditions are the same as those in Example 1 has a Gurley gas permeability almost equal to that in Reference Example 1, and Comparative Example 4 in which the stretching region A in the front stage has a temperature higher than that of the stretching region B has a Gurley gas permeability larger than that in Reference Example 1.

Comparative Example 5 and Comparative Example 6 in which conversely to Example 1, the film widening speed of the stretching region A in the front stage is lower than that in the stretching region B also have a Gurley gas permeability larger than that in Reference Example 1.

From the above results, it has become apparent that when the temperature of the stretching region having a high film widening speed is lower than that of the stretching region having a film widening speed, and the stretching region having a high film widening speed is situated in the front stage with respect to the stretching region having a low film widening speed, the Gurley gas permeability can be reduced, i.e. the ion permeability can be increased, while a predetermined porosity and average pore diameter are maintained.

Comparison of Example 1 with Example 2 shows that the Gurley gas permeability can be reduced as a difference in temperature between the stretching region A and the stretching region B increases.

<Laminated Porous Film 1>
(1) Preparation of Coating Solution 1
A coating solution 1 is prepared in accordance with the following procedure.
First, as a medium, carboxymethyl cellulose (CMC; CEROGEN 3H manufactured by DAI-ICHI KOGYO SEIYAKU CO., LTD.) is dissolved in a 20 wt % aqueous ethanol solution to obtain a CMC solution (CMC concentration: 0.70% by weight based on CMC solution).
Then, 3500 parts by weight of alumina (AKP 3000 manufactured by Sumitomo Chemical Co., Ltd.) is added to and mixed with 100 parts by weight of the CMC solution in terms of CMC, and the mixture is treated three times under high-pressure dispersion conditions (60 MPa) using a Gaulin homogenizer, thereby preparing the coating solution 1.
(2) Production of Laminated Porous Film
The coating solution 1 is applied to both surfaces of the porous film obtained as described above using a gravure coating machine, and the porous film is dried to prepare a laminated porous film including a base porous film and a heat resistant layer. The resulting laminated porous film exhibits a good ion permeability, and retains the shape by action of the heat resistant layer even when the base porous film is shut down due to a high temperature.

<Laminated Porous Film 2>
(1) Preparation of Coating Solution 2
A coating solution 2 is prepared in accordance with the following procedure. Poly(paraphenylene terephthalamide) is produced using a 3-litter separable flask having a stirring blade, a thermometer, a nitrogen inlet pipe and a powder addition port. The flask is sufficiently dried, 2200 g of N-methyl-2-pyrrolidone (NMP) is added therein, and 151.07 g of a calcium chloride powder dried under vacuum at 200° C. for 2 hours is added, and completely dissolved by elevating the temperature to 100° C. The solution is returned to room temperature, and 68.23 g of paraphenylene diamine is added and completely dissolved. While the solution is kept at 20° C.±2° C., 124.97 g of terephthalic acid dichloride is added in 10 portions at intervals of about 5 minutes. Thereafter, the solution is aged for 1 hour with stirring while being kept at 20° C.±2° C. The solution is filtered with a 1500-mesh stainless wire screen. The obtained solution has a paraamide concentration of about 6%.

Next, 100 g of the paraamide solution is weighed and taken in a flask, 300 g of NMP is added to prepare a solution having a paraamide concentration of 1.5% by weight, and the solution is stirred for 60 minutes. 6 g of Alumina C (manufactured by Nippon Aerosil Co., Ltd.) and 6 g of Advanced Alumina AA-03 (manufactured by Sumitomo Chemical Co., Ltd.) are mixed with the solution having a paraamide concentration of 1.5% by weight, and the mixture is stirred for 240 minutes. The obtained solution is filtered with a 1000-mesh wire screen, 0.73 g of calcium oxide is then added, and the mixture is stirred for 240 minutes to be neutralized, and is defoamed under reduced pressure to obtain a slurry coating solution 2.

(2) Production of Laminated Porous Film

The coating solution 2 is applied to one surface of the porous film using a bar coating machine, and the porous film is dried to prepare a laminated porous film including a polyolefin layer and a heat resistant layer. The resulting laminated porous film exhibits a good ion permeability, and retains the shape by action of the heat resistant layer even when the base porous film is shut down due to a high temperature.

INDUSTRIAL APPLICABILITY

According to the present invention, there can be provided a separator suitable as a separator for an on-board secondary battery, which is hard to be short-circuited and has a high ion permeability. According to the present invention, a desired separator is obtained only by appropriately combining temperatures in a stretching without requiring a special apparatus, so that production costs can be reduced.

The invention claimed is:

1. A method for producing a polyolefin porous film, the method comprising a film stretching step of conveying a raw material polyolefin sheet having pores into a furnace of a tenter type stretching machine, and tenter-stretching the sheet in a plurality of stretching regions in the furnace, wherein
the plurality of stretching regions include at least two stretching regions having different film widening speeds, and the temperature of a stretching region having a high film widening speed is lower than that of a stretching region having a low film widening speed in the at least two stretching regions, and
a stretching region having the highest film widening speed is situated in the front stage with respect to a stretching region having the lowest film widening speed.

2. The method for producing a polyolefin porous film according to claim 1, wherein the raw material polyolefin sheet is stretched to a thickness of 5% or more and 40% or less of the initial value when supplied to the stretching region having the lowest film widening speed.

3. The method for producing a polyolefin porous film according to claim 1, wherein a difference in temperature between the stretching region having the highest film widening speed and the stretching region having the lowest film widening speed is 10° C. or higher.

4. The method for producing a polyolefin porous film according to claim 1, wherein
the film widening speed ($S_A$) in the stretching region having the highest film widening speed is two times or more of the film widening speed ($S_B$) in the stretching region having the lowest film widening speed, where the film widening speed is defined as S represented by the formula (1):

$$\text{film widening speed } S = V \times W/L \tag{1}$$

wherein L represents a distance in a film conveyance distance in each stretching region, W represents a difference between distances between intersections of lines orthogonal to the film conveyance direction and a tenter rail in each stretching region, and V is a speed at which a film passes through each stretching region in a conveyance direction.

5. The method for producing a polyolefin porous film according to claim 1, wherein the tenter stretching is uniaxial stretching.

6. The method for producing a polyolefin porous film according to claim 1, wherein the raw material polyolefin sheet comprises an ultrahigh molecular weight polyolefin having a weight average molecular weight of 500000 or more and a polyolefin wax having a weight average molecular weight of 2000 or less.

7. The method for producing a polyolefin porous film according to claim 1, wherein the raw material polyolefin sheet has a porosity of 30 to 50% by volume.

8. A laminated porous film, wherein a heat resistant layer is laminated on the polyolefin porous film obtained by the method for producing a polyolefin porous film according to claim 1.

* * * * *